Aug. 5, 1969  E. E. HILL, JR  3,460,138
ELECTRONIC COUNTERMEASURE PLOTTING
Filed June 27, 1966  3 Sheets-Sheet 1

INVENTOR.
EARL E. HILL, JR.
BY Harry A. Herbert Jr.
Sherman H. Goldman
ATTORNEYS

INVENTOR.
EARL E. HILL, JR.

United States Patent Office

3,460,138
Patented Aug. 5, 1969

3,460,138
ELECTRONIC COUNTERMEASURE PLOTTING
Earl E. Hill, Jr., with the armed forces of the United
States, assignor to the United States of America as represented by the Secretary of the Air Force
Filed June 27, 1966, Ser. No. 562,428
Int. Cl. G01s 7/04
U.S. Cl. 343—5                                     6 Claims

ABSTRACT OF THE DISCLOSURE

A lighted strobe plotting table to provide a mechanized display of passive electronic countermeasure data. The projection arrangement forms a fan-shaped beam of light to intersect a translucent plotting surface in order to display a pie-shaped strobe with its origin at a fixed point on the board's surface. By rotating the projection system and pulsing the light source at selected azimuths, a number of strobes can be displayed around one point which represents a radar site location. Display of azimuth only information from several sites is, therefore, both possible and practical.

---

The lighted strobe table which is capable of displaying strobe data for manual raid plotting requires a rapid setting by the operator without the use of extra equipment such as a drafting arm or the use of grease pencil drawings to locate strobe intersections. The featuring of the strobes as solid lighted beams rather than outlines avoids confusion and the intersection of light beams results in a brightened area common to the two or more strobes at the intersection because of the additive effect of light. Furthermore, the use of beams from a particular radar site representation allows for color coding of the beams in order to improve clarity. Redundant information may be eliminated by shutting off strobes without changing the remainder of the display.

Accordingly, it is a primary object of this invention to provide a display of strobe data capable of integrating received data from several radar sites.

It is another object of this invention to provide a display of strobe data which eliminates parallax of multilayered boards and allows for more than one plotter.

A further object of this invention is to provide an azimuthal display which avoids the use of grease pencils and allows for deletion of redundant data.

It is still another object of this invention to provide an azimuthal display apparatus which allows for rapid setting and reading of the display data in that it utilizes solid beams rather than outlines.

It is a still further object of this invention to provide an azimuthal display apparatus which allows for color coding of the beams.

Another object of this invention involves the provision of azimuthal display of strobe data for manual raid plotting which is easily and economically produced of conventional, currently available materials which lend themselves to standard mass production manufacturing techniques.

These and other advantages, features and objects of the invention will become more apparent from the following description taken in connection with the illustrative embodiments in the accompanying drawings, wherein.

Figure 2:
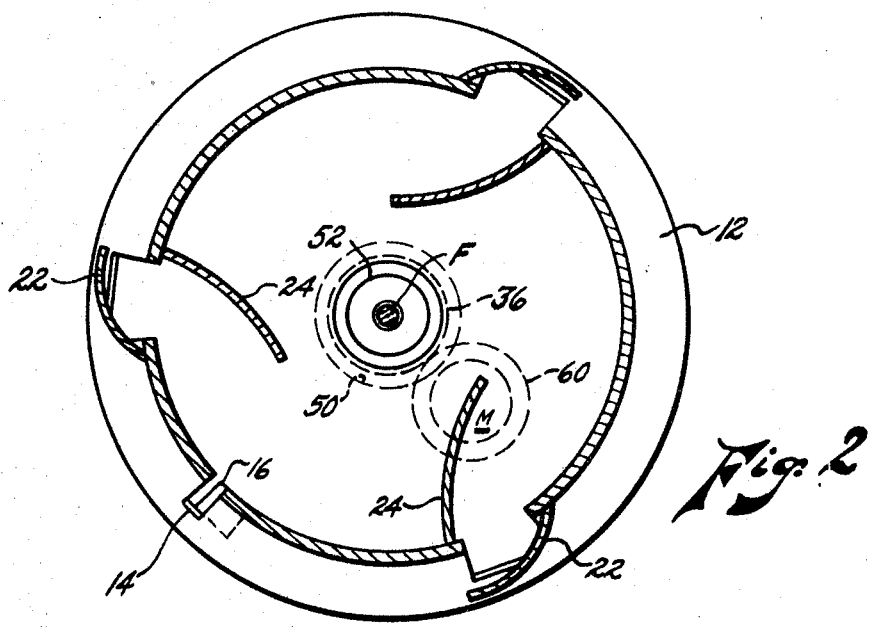
FIGURE 2 is a sectional view taken on lines II—II of FIGURE 1.
Figure 1:
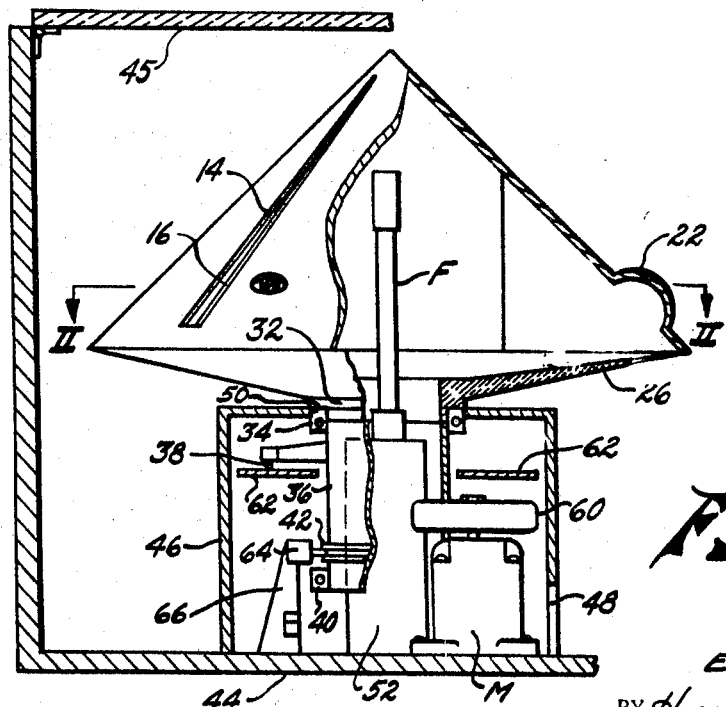
FIGURE 1 is a front elevational view, partly in section, of the projecting means of this invention.
Figure 3:
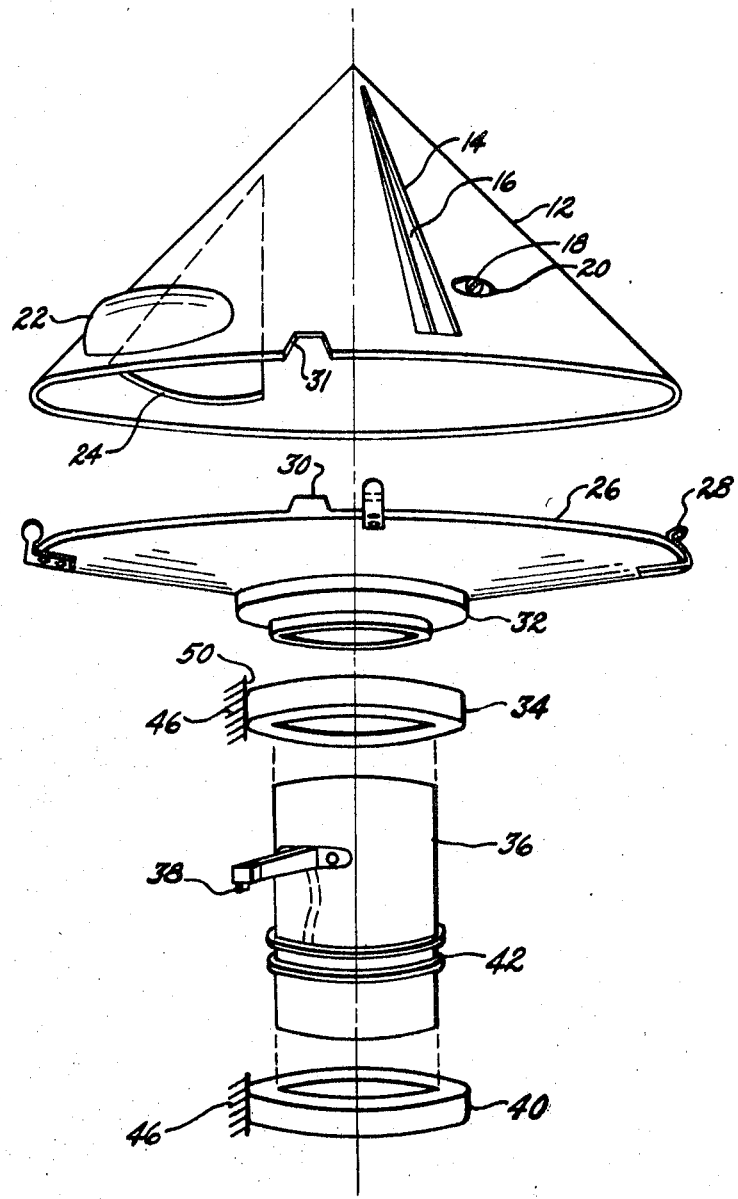
FIGURE 3 is an exploded pictorial view of a portion of the projector.

The projector layout illustrated in FIGURES 1 through 3 provides for the improvement of a lighted strobe design. A cone 12 having a sector 14 cut out therefrom is arranged to have an aperture adjustment plate 16 (most clearly shown in FIGURE 3) mounted therein which may be set by means of a set screw 18 through a slotted hole 20 in the cone. A vent louver 22 on the external surface of the cone provides for a forced draft and together with internal vanes 24, three of which are shown in FIGURE 2, aid in the proper movement of cooling air. The cone 12 is mounted on a cone support 26 which has on the periphery thereof spring clips 28 which are arranged to engage the base of the cone. An indexing log 30 is arranged to mesh with a corresponding groove 31 in the cone structure.

A hub 32 secured to and beneath the cone support 26 allows for rotary motion of the cone because of its being journaled in ball bearing race 34 which is fixedly attached to a frame or housing 46, which is schematically represented in FIGURE 3 and more clearly shown in FIGURE 1. A dielectric drive tube 36 which has an azimuth brush 38 pivotally mounted thereon is journalled in a ball bearing race 40 therebeneath which is also attached to the fixed frame or housing 46. On the exterior of the drive tube 36 is mounted a slip ring 42, the connection of which will be later described. The cone 12, cone support 26, hub 32, ball bearing race 34, drive tube 36 and ball bearing race 40 are all mounted on the same axis. The elements thus far described comprise the rotating assembly for the projector unit.

A base 44 (FIGURE 1) which would form a part of the box shaped plotting table has a fixed frame or housing 46 mounted thereon with apertures 48 for air passage and a central aperture at 50 for the drive tube 36 of the hollow rotating assembly. Within the rotating assembly is mounted a flashtube support 52 which has an extension lying along the axis of rotation with a flashtube F in the cone, as shown in FIGURE 1. A motor M having a drive wheel 60 bears against the outer periphery of the drive tube 36 to cause rotation thereof. An azimuth commutator 62 is mounted around the inner periphery of the casing 46 and is insulated therefrom with its position such that azimuth brush 38 is in contact therewith. A slip ring brush 64 is fixedly mounted on a support 66 to engage the slip ring 42 on the drive tube 36. Since the drive means operates to rotate the cone 12, the forced air ventilation described relative to vanes 24 utilize the power available from the drive motor M and eliminates cumbersome blower and ductive systems.

Figure 4:
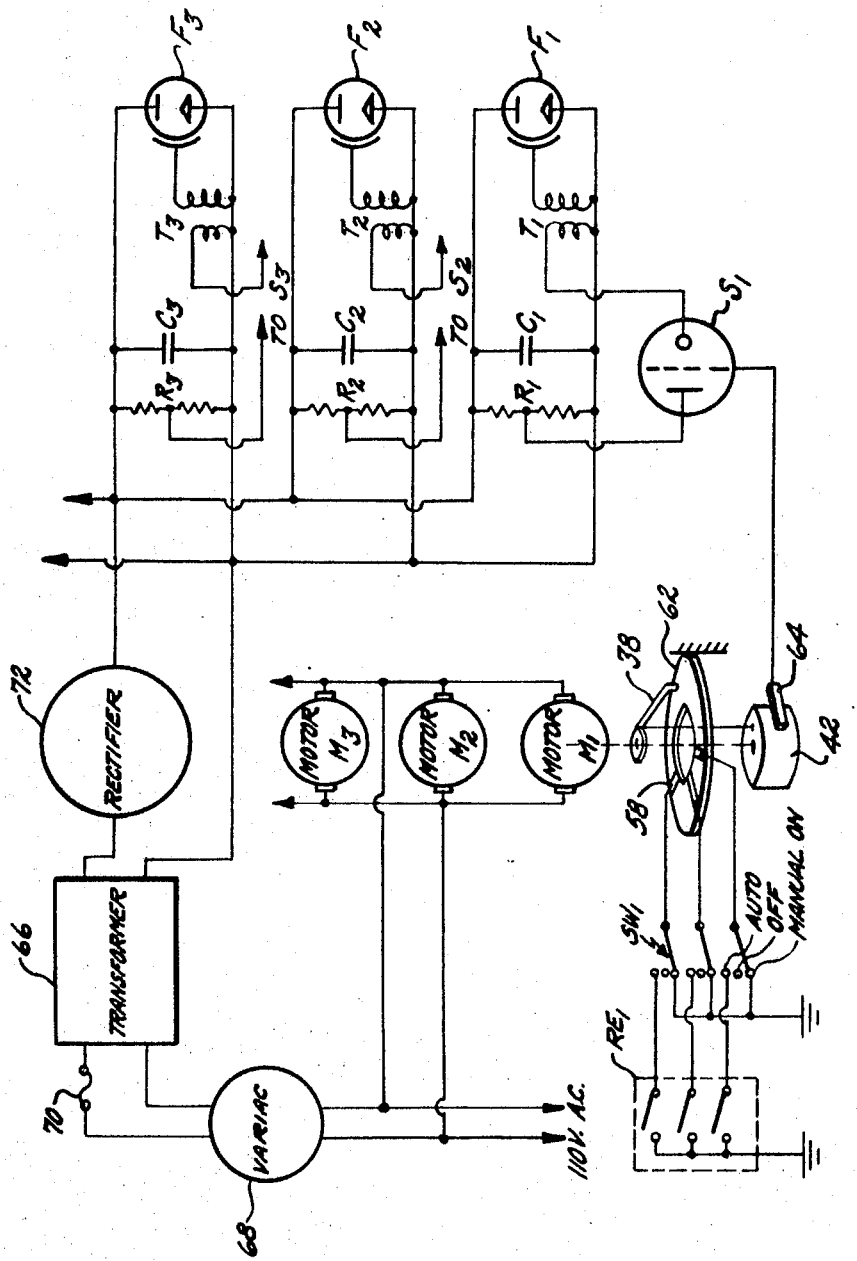
FIGURE 4 is a schematic arrangement of the power supply and switching arrangement of the projector.

A power supply is shown in FIGURE 4 and is planned to be common to several projector units installed in one strobe table. The power unit shown would be capable of supplying power for about six units (or radar site representations). For larger sectors more than one power modular unit might be necessary or, alternatively, one with an increased output to take the load could be provided. By utilizing a modular design installation and maintenance is reduced.

The power supply shown in FIGURE 4 essentially comprises a transformer 66 which receives the power from a conventional AC source through a Variac 68. A fuse 70 provides a safety feature for the circuitry. Rectifier 72 receives the output from the transformer and provides a high voltage direct current charging of the capacitors C for each of the flashtube circuits. The separate circuit elements for each flashtube circuit are identical and are differentiated by subscripts for the elements of each circuit. Thus, the capacitor for the first flashtube circuit is designated $C_1$. Separate charging must be maintained for each flashtube F since they do not operate simultaneously. The power supply recharges each capacitor to 90% or more of the peak voltage before the next flashtube pulse is required. If this were not arranged in this manner, perceptible variation in the brightness of adjacent strobes would be apparent or, alternatively, a flashtube F may even fail to fire.

The power supply also provides the energy for the trigger tube circuits. Across each capacitor and power supply is provided a center tapped resistor R, which is connected with the plate of a strobotron switch S (only one of which is shown) which functions as the trigger circuit. The cathode thereof is connected to one side of a transformer T to drive the ionizing lead of the flashtube F to cause breakdown of the gas and a pulse of current from the power supply. It is contemplated that a high pressure type flashtube F under sufficient pressure to prevent the capacitor voltage from firing a tube would be utilized.

A switch assembly SW is provided to allow an operator to select the azimuths at which strobe beams of light should appear. Only one switch is shown; however, a separate switch would be provided for each flashtube F. For optimum use and data association, the switch assembly for each radar site might be centered directly over that site on the strobe table surface 45. This would allow the operator at the board to correlate directly his switch actions with the display. He could then use the switches more effectively when inserting new data and removing old or excess strobes. If the construction of the switch and the cable attachment to the commutator assembly (one wire connector required for each strobe displayed) is too bulky to mount on the translucent board 45, the switch assembly may be mounted practically anywhere that is convenient. The location may be on the side of the strobe table, a nearby SAGE situation display console, or at some other remote position, to be set by personnel other than the plotting board team.

The function of the strobe selection switch assembly SW is to complete the flashtube triggering circuit up to individual segments of the azimuth commutator. The switch assembly SW in its simplest form would be a set of miniature two-position switches arranged in a circle, with the toggle in the outward position being "ON" and at the inward position being "OFF." A quick sweep of the operator's hand could set any one or several switches, or clear the whole circle to remove all strobes. All switches are attached to a common ground on one side, and the other lead of each switch is attached to a single segment 58 in a azimuth commutator 62. In the circular design, each switch location corresponds to the strobe azimuth which will be obtained by turning it on.

An alternate switch type might be a pushbutton, which would have to lock in the "ON" position when pushed, and could be easily cleared again.

The switch assembly effectively performs a memory function for the operator. Once set, a strobe will be displayed at the selected azimuth until the switch is turned off. Each time new radar reports become available the new display can be set in and the plotter can operate on the strobe picture which is continuously before him.

It is possible for automatic inputs to be effected if a bank of relays RE or other devices are placed in series with the switch assembly. The relays could be controlled by AN/FST-2 input, azimuth-time recorder input, or by the computer. The board operator would then have presented to him a constantly up-to-date strobe plot and still be able to reject automatic data or operate manually. As shown in FIGURE 4, an automatic position is shown for $SW_1$ wherein signals presented through relays RE would automatically activate the circuit at the appropriate azimuth.

The azimuth commutator 62, thus, is one of the two switches in the flashtube trigger circuit. Its function is to close the circuit at the instant the aperture on the cone surface passes the azimuth previously selected for the appearance of a strobe. The cone support shaft carries with it the brush 38 which contacts each of the azimuth commutator segments 58 as the cone rotates, in the same manner as the brush contacts of an electric motor. The number of segments 58 contained on the commutator will be determined by the azimuth spacing of strobes. A four degree spacing will mean there are 90 segments in the commutator circumference.

Since the trigger pulse required at the commutator is of very low energy, sufficient to drive the thyratron, grid, the commutator construction 62 can be light and simple to enable the close segment spacing necessary. A printed circuit card, with printed segments 58, or wires pressed into its surface should be adequate. The trigger circuit is completed through the rotating portion of the assembly via the cone support shaft and a slip ring brush 64.

From the foregoing, it should be apparent that there are many variations which would fall within the scope of the invention as thus presented. For example, provision could be made for varying the intensity of the light emanating from the flashtube F and providing colored light by inserting a filter in the slit 14 of the cone 12. The intensity could be varied by controlling a filter adapted to absorb light also mounted in the slit 14.

The box is topped by the translucent surface 45 which would be a plastic sheet having geographic outlines, georef coordinate markings and an azimuth circle around each major radar site indicated thereon. The light projectors, previously described, would be mounted inside the box below the map position of each radar site and each would contribute strobe azimuth data.

For best results the flashtube utilized should be one having nearly a point source of light or one which presents the same cross section about one axis, i.e., a straight tube. These conditions are imposed in order to avoid a blurred beam which appears wider or which contains several images of the slit.

Thus, it can be seen that a mechanized display of passive electronic countermeasure data is provided by a projection arrangement which forms a fan-shaped beam of light to intersect a translucent plotting surface and display a pie-shaped strobe with its origin at a fixed point on the board surface. By rotating the projection system and pulsing the light source at selected azimuths, a number of strobes can be displayed around one point which represents a radar site location. Display of azimuth only information from several sites is, therefore, made practical.

Although the invention has been described with reference to a particular embodiment, it will be understood to those skilled in the art that the invention is capable of a variety of alternative embodiments within the spirit and scope of the appended claims.

I claim:

1. A lighted strobe plotting table for mechanized display of passive electronic data comprising:
   a translucent plotting surface, and
   projection means for displaying a pie-shaped strobe with its origin appearing as a fixed point on said translucent plotting surface, said projection means comprising:
   a cone shaped member having a variable width sector portion removed,
   means for rotating said cone shaped member at a predetermined speed,
   light source means within said cone, and
   means for flashing said light source means at preselected azimuths representing a spoke or strobe pattern which designates the appearance or description of excess radar data return.

2. A device as defined in claim 1 including means for indexing and synchronizing said light source means with predetermined positions of the variable width sector portion.

3. A device as defined in claim 1 wherein the speed of rotation of said cone shaped member and the repetition frequency of the flashings of said light source means is maintained such as to produce an image of a strobe at an azimuth which appears faster than the image decay on a human retina.

4. A device as defined in claim 1 wherein the width of said variable width sector is adjustable.

5. A device as defined in claim 1 wherein said means for flashing said light source means includes a power supply.

6. A device as defined in claim 1 including a series of projection means located beneath said translucent plotting surface.

References Cited

UNITED STATES PATENTS 3,134,974   5/1964   Orenstein _____ 343—5 XR

CHARLES L. WHITHAM, Primary Examiner

U.S. Cl. X.R.

350—274